US009374157B2

(12) United States Patent
Murphy et al.

(10) Patent No.: US 9,374,157 B2
(45) Date of Patent: Jun. 21, 2016

(54) DROP DISCRIMINATING NETWORK ALARM SYSTEM UTILIZING A SINGLE SENSING FIBER

(71) Applicant: Network Integrity Systems, Inc., Hickory, NC (US)

(72) Inventors: Cary R. Murphy, Hickory, NC (US); Mark K. Bridges, Hickory, NC (US); David E. Vokey, Sidney (CA); Daniel Goertzen, Winnipeg (CA); Joseph Giovannini, Hickory, NC (US)

(73) Assignee: Network Integrity Systems, Inc., Hickory, NC (US)

( * ) Notice: Subject to any disclaimer, the term of this patent is extended or adjusted under 35 U.S.C. 154(b) by 0 days.

(21) Appl. No.: 14/457,818

(22) Filed: Aug. 12, 2014

(65) Prior Publication Data

US 2015/0086195 A1    Mar. 26, 2015

Related U.S. Application Data

(60) Provisional application No. 61/881,407, filed on Sep. 23, 2013.

(51) Int. Cl.
*H04B 10/08* (2006.01)
*H04B 10/079* (2013.01)
*H04B 10/25* (2013.01)
*G01M 11/00* (2006.01)

(52) U.S. Cl.
CPC ......... *H04B 10/079* (2013.01); *G01M 11/3181* (2013.01); *H04B 10/25* (2013.01)

(58) Field of Classification Search
CPC .... H04B 10/07; H04B 10/071; H04B 10/079; H04B 10/0791; H04B 10/0793; H04B 10/0771; H04B 10/0773

USPC .......... 398/16, 20, 28, 33, 13, 14, 21, 25, 10, 398/17, 72, 79, 66, 67, 68, 70, 71; 356/73.1; 385/12, 13, 29

See application file for complete search history.

(56) References Cited

U.S. PATENT DOCUMENTS

| 7,142,737 | B1 | 11/2006 | Murphy et al. | |
|---|---|---|---|---|
| 7,706,641 | B2 | 4/2010 | Murphy et al. | |
| 2006/0110161 | A1* | 5/2006 | Cho | H04B 10/071 398/72 |
| 2007/0133922 | A1* | 6/2007 | Murphy | G02B 6/421 385/12 |
| 2009/0263123 | A1* | 10/2009 | Zhu | H04B 10/071 398/16 |
| 2010/0135653 | A1* | 6/2010 | Lee | H04B 10/272 398/25 |
| 2013/0259469 | A1* | 10/2013 | Smith | H04J 14/0227 398/16 |

\* cited by examiner

*Primary Examiner* — Hanh Phan
(74) *Attorney, Agent, or Firm* — Adrian D. Battison; Ade & Company Inc (57) ABSTRACT

A method is provided for detecting movement indicative of intrusion events on optical drop fibers of a network where the individual drop fiber can be identified to locate the event. The method uses a monitor system at the network end and multiplexing the monitor signal along the individual fibers to the respective terminals. At each of the terminals, the monitor signal is returned unchanged or in modified form along the same or different fibers to the network end. At the network end the received monitor signals is analyzed for changes in said monitor signals indicative of movement. Which one or more of the drop fibers has triggered the alarm is determined by modifying the monitor signal in wavelength or polarization, or by applying a modulation at the source and/or at multiplexing and/or at returning so that the monitor signal of one drop fiber has a difference from the monitor signal of another drop fiber.

23 Claims, 9 Drawing Sheets

DROP DISCRIMINATING NETWORK ALARM SYSTEM UTILIZING A SINGLE SENSING FIBER

This application claims the benefit under 35 USC 119 e) of Provisional Application 61/881,407 filed Sep. 23, 2013.

This invention relates to a method for detecting intrusion into optical fiber cables of a network which comprises a plurality of drop fibers each having a first end at a network end and a second end connected to respective ones of a plurality of terminals at respective end users, a data source at a network end for supplying a data signal on an input fiber and a multiplexing system for separating the data signal on the input fiber to each of the plurality of drop fibers for supply to the respective terminals where the network alarm system utilizes a sensing fiber, which is capable of discerning which one or more of many branches or "drops" is being disturbed.

This invention monitors over a single fiber by distributing devices to both ends of the fiber. This might include coupling the transmit and receive circuits of a standard monitoring system and returns the signal at the far end by means of a reflection or loopback or by placing a portion of the active circuitry at both ends.

BACKGROUND OF THE INVENTION

According to US Government regulations, a network carrying unencrypted classified data must be protected by a Protected Distribution System (PDS). One form of PDS is the Alarmed Carrier, which is a system by which a conveyance or carrier is alarmed by a device for detecting intrusions and attempted intrusions.

An example of an arrangement of this type is shown in U.S. Pat. No. 7,706,641 issued Apr. 27, 2010 by the present Applicants, as well as application Ser. No. 14/144,882 filed Dec. 31, 2013 by the present applicants now pending and entitled Network Alarm System Utilizing a Single Sensing Fiber, the disclosure of which is incorporated herein by reference.

Another example of an arrangement of this type is shown in U.S. Pat. No. 7,142,737 issued Nov. 28, 2006 by the present Applicants, the disclosure of which is incorporated herein by reference. This discloses a method of detecting a potential intrusion event by sensing changes in polarization and uses Fresnel reflections and Rayleigh backscattering in time sliced data to locate the intrusion event at its position along a fiber.

Reference is also made to application Ser. No. 14/145,121 filed Dec. 31, 2013 by the present applicants now pending and entitled An Alarm System For An Optical Network and which relates to a method in which there is provided at each of said end user terminals a monitor signal receiver system for detection and conversion of data from the analysis into a signal and for transmitting the signal from each of the user end terminals back to the monitor system, the disclosure of which is incorporated herein by reference.

The above patent describes that some or all of the optical fibers of a single-mode or multi-mode cable are monitored for intrusion by transmitting through the fibers a signal which can be analyzed for changes in its characteristics which are indicative of movement as a prelude to an intrusion event.

Data can be stolen from an optical fiber by removing the jacket and installing a tap device on the fiber. Optical fiber intrusion detection systems of the type described above detect when a fiber cable is being subjected to vibration and handling that would be typical of an intrusion attempt. The system reports the intrusion attempt to the cable owner or other responsible individual so that the cable can be inspected and the threat removed.

The fiber intrusion detection system works by transmitting a monitoring signal through a fiber. Disturbances on the fiber cause the monitoring signal to be modulated. At an end of the loop, the modulated signal is received, digitized and processed, and alarms are raised when an intrusion is detected.

Historically, alarmed carriers required two fibers for monitoring-classically one carrying the laser signal away from the monitoring device, and one carrying the alarm signal back, these joined at the far end (known as "looping back").

Recent advances in technology have seen the introduction of the Passive Optical Network (PON). A passive optical network (PON) is a point-to-multipoint, fiber to the premises network architecture in which unpowered optical splitters are used to enable a single optical fiber to serve multiple premises, typically in the range 16-128. The PON is a system which delivers bidirectional communication over a single fiber by use of separation of send and receive by utilizing separate wavelengths. A PON consists of an optical line terminal (OLT) at the service provider's central office and a number of optical network terminals (ONTs) near the end users. A PON reduces the amount of fiber and central office equipment required compared with point-to-point or other legacy network architectures.

SUMMARY OF THE INVENTION

It is one object of the invention to provide an alarm system of the above type which is capable of discerning which one or more of many branches or "drops" is being disturbed.

According to a first aspect of the invention there is provided a method for detecting intrusion into optical fiber cables of a network, wherein the network comprises:

a plurality of drop fibers each having a first end at a network end and a second end connected to respective ones of a plurality of terminals at respective end users;

a multiplexing system for separating signals on an input fiber to each of the plurality of drop fibers for supply to the respective terminals;

the method comprising:

providing a monitor system at the network end having a monitor signal output from a monitor signal source;

multiplexing the monitor signal output for supply along fibers to the respective terminals as a monitor signal;

at each of the terminals, returning the monitor signal along fibers to the network end;

at the network end analyzing received monitor signals after transmission along said fibers for changes in said monitor signals indicative of movement of said fibers for detecting an intrusion event on one or more of the drop fibers;

and determining which one or more of the drop fibers has said movement thereof by modifying the monitor signal at said monitor signal source and/or at said multiplexing and/or at said returning so that the monitor signal of one drop fiber has a difference from the monitor signal of another drop fiber;

and detecting the difference to determine said one or more of the drop fibers which has said movement.

In one embodiment the difference between the signals in the drop fibers is based on differences in wavelength.

In another embodiment the difference between the signals in the drop fibers is based on differences in polarization.

In yet another embodiment the difference between the signals in the drop fibers is based on differences in frequency of a modulation of the signals.

Embodiments using the above differences can be provided where the monitor signal is modified at the source and/or at the multiplexing.

For example the monitor signal can modified at the multiplexing by WDM to generate a plurality of different wavelengths. Alternatively the monitor signal can modified at the source by generating different wavelengths in a plurality of different signals.

Where the monitor signal is modified at the source and/or at the multiplexing it can be unchanged at the returning point simply by using a reflection such as a gold end termination.

Preferably the monitor signal is modified by selecting a plurality of separate wavelengths.

However alternatively the monitor signal on each fiber after multiplexing is the same for each drop fiber and the monitor signal is modified at said returning for example by using one or more wavelength filters such as Bragg gratings at the end terminal so that one or more different wavelengths are returned for analysis at the network end to determine which drop is alarmed be detecting the differences between the returned signals.

In this case the monitor signal can be broadband or can be defined by a selected plurality of wavelengths.

In a particularly preferred arrangement, the monitor signal is defined by a selected plurality of wavelengths and wherein the monitor signal is modified at return to return selected one or ones of the wavelengths and wherein Boolean analysis of all the wavelengths received at the network end is carried out to determine which of the wavelengths has said changes and therefore which of the drop cables has said movement.

In another arrangement, each terminal contains a polarizer which generates a return signal of a predetermined difference in polarization relative to a reference polarization and wherein the predetermined difference of each terminal is different from each of the others.

In yet another arrangement, the monitor signal is modulated with a different frequency for each of the drop cables. This arrangement is advantageous in that the received modulated signals in optical form can be converted to an electrical signal for analysis of the differences using low cost electronic analysis systems.

Where required the monitor fibers of selected drop cables can be disabled for monitoring by choosing a termination of the monitor fiber at the terminal thereof which does not return the signal. Thus these selected drop fibers are excluded from the alarm system and do not contribute any signal to the analysis system.

In another cost advantageous system at the network end the received monitor signals are analyzed using a system which does not need to distinguish the received signal from each drop fiber relative to the other drop fibers. Thus for example where the signals are separated by wavelength, a low cost broadband analysis can be done and the modified monitor signals are arranged to be transmitted in selected time slices so that those drop fibers which have the movement for the alarm are determined by detecting which time slice the modified signal is located.

According to a further aspect of the invention there is provided a method for detecting intrusion into optical fiber cables of a network, wherein the network comprises:

a plurality of drop fibers each having a first end at a network end and a second end connected to respective ones of a plurality of terminals at respective end users;

a multiplexing system for separating signals on an input fiber to each of the plurality of drop fibers for supply to the respective terminals;

the method comprising:

providing a monitor system at the network end having a monitor signal output from a monitor signal source;

multiplexing the monitor signal output for supply along fibers to the respective terminals as a monitor signal;

providing at each of said end user terminals a monitor signal receiver system for detection and conversion of data from the analysis into a signal;

transmitting the signal from each of the user end terminals back to the monitor system to provide a plurality of separate different signals each relating to a respective drop fiber;

and determining which one or more of the drop fibers has said movement thereof by detecting a difference between said plurality of separate different signals.

That is each of a plurality of the end user terminals includes a receiver for detection of the monitor signal after transmission along the respective fiber and the receiver acts to generate a digital signal to be sent back from the receiver. The data signal sent back can be on the same fiber as the monitor signal or by anther transmission route.

Preferably the receiver system is powered by extracting energy from light transmitted to the respective user terminal.

According to a further aspect of the invention there is provided a method for detecting intrusion into optical fibers of a network, wherein the network comprises:

a plurality of drop fibers each having a first end at a network end and a second end connected to respective ones of a plurality of terminals at respective end users;

a multiplexing system for separating signals on an input fiber to each of the plurality of drop fibers for supply to the respective terminals;

the method comprising:

providing a monitor system at the network end having a monitor signal output from a monitor signal source;

multiplexing the monitor signal output for supply along fibers to the respective terminals as a monitor signal;

at each of the user terminals splitting the monitor signal into a plurality of separate paths;

wherein each of the plurality of separate paths has a different fiber length up to a reflective end so that a Fresnel reflection from each of the ends will take place at a different time which can be detected at the network end by a detector;

wherein each terminal is arranged to have a unique set of the lengths so that detection of the Fresnel reflections from the fiber paths at the network end at the detector can obtain the unique set which forms a signature;

and determining which one or more of the drop fibers has said movement thereof by said signature.

Preferably at the network end there is provided a detector system for the Fresnel reflections and for the Rayleigh backscattering and wherein the detector system uses a high gain for Rayleigh scattering and low gain for Fresnel reflections.

This can use a splitter with a first detector system for the Fresnel reflections and a second detector system for the Rayleigh backscattering where the first and second detectors use a high gain for Rayleigh scattering and low gain for Fresnel reflections.

That is the optical signal is watched for Fresnel reflection and Raleigh backscatter is the same optical signal, with the difference that the Rayleigh signal is orders of magnitude lower than Fresnel and requires a receiver of higher gain. This can be done using two receivers which allows watching for both simultaneously. However for cost and simplicity reasons, the same receiver can be used but the gain is switched between high sensitivity (Rayleigh) and low sensitivity for Fresnel.

Other important optional features of the arrangements as defined above can include the following:

The network typically includes a data source and data fibers but systems using the same concepts can be provided where no data fibers are present such as in perimeter fencing where there is no intention to communicate data.

The monitor system acts by providing at least one sensor arrangement for receiving a light signal transmitted through the fibers, detecting a series of received light signals, which can be either CW light or a series of pulses, which have been transmitted along the fibers to be monitored; comparing at least some of the received light signals relative to data obtained from previously received ones of the received light signals to detect changes in the received light signals relative to the previously received light signals; and analyzing the changes to determine any changes which are indicative of manipulation of the optical fiber causing movement of a portion thereof along the length thereof.

The monitor system acts to generate an alarm in response to the detection of any such changes which are indicative of manipulation of the optical fiber causing movement of a portion thereof along the length thereof.

The receive input and the transmit output of the monitor signals are connected into the same fiber by use of an optical coupler.

The method includes summing the receive input and the transmit output of the monitor signals are connected into the same fiber by use of another device.

The method includes providing an optical isolator on the laser output leg to protect the signal laser from reflections.

The method includes providing an insensitive lead-in fiber leading to the multiplexer.

The method includes using as 1×2 couplers a 2×2 coupler with the extra leg terminated where the extra leg has a low reflectance termination.

The method includes providing treating connectors on a junction box of the multiplex system with low reflectance termination index matching gel (aides in moves adds and changes).

The fiber is non-reflective, and can be used as needed by plugging in a new fiber.

The method includes providing terminating connectors on the junction box of the multiplex system with low reflectance termination such as a mating connector with index matching gel or a "dog legged" non-reflective fiber stub.

The PON or data signal and the monitor signal are located in an armored duplex zip cord so as to meet approval for armored cable PDS.

The PON or data signal and monitor signal are multiplexed using WDM so SPON exists on a single fiber.

The multiplexing is performed by wavelength, utilizing an out of band laser for monitoring, coupled in through a WDM.

The method includes providing using an unused wavelength of the PON transmitter as the monitor source.

The monitor signal is returned at the end user by a 1×2 coupler joining the two legs together to loopback the signal by means of splicing or mechanical connection.

The method includes providing an optical connector to terminate the monitored fiber in the UB by way of deposited reflective material such as Au or an open air reflection.

The receive input and the transmit output of the monitor signals are connected into the same fiber by a device which is internal to alarm unit creating a one-box solution.

The receive input and the transmit output of the monitor signals are connected into the same fiber by a device which is external to and remote from the alarm unit.

The cables to the users are all fiber cables or alternatively the cables to the users are hybrid fiber/electrical The detection system is as described in the above patent and can be multimode or single mode fiber systems as described.

The data fiber and monitor fiber can be the same fiber or different fibers.

The network is a Passive Optical Network (PON).

The head end is an optical line terminal (OLT).

The terminal is an optical network terminal (ONT).

Where the data and monitor signals are on different fibers they are associated in a common cable to the respective terminal so that movement of the data fiber causes movement of the monitor fiber.

That is the arrangement of the present invention provides a generic discriminating implementation which is able to differentiate which leg or drop is being intruded upon. This application describes multiple techniques.

BRIEF DESCRIPTION OF THE DRAWINGS

Embodiments of the invention will now be described in conjunction with the accompanying drawings in which:

As shown in FIGS. 4 to 13 the components used at terminal 1 are shown only for convenience of illustration and it will be appreciated that each of the other terminals has a symmetrical set of the same components for cooperation with that terminal.

DETAILED DESCRIPTION

Figure 1:
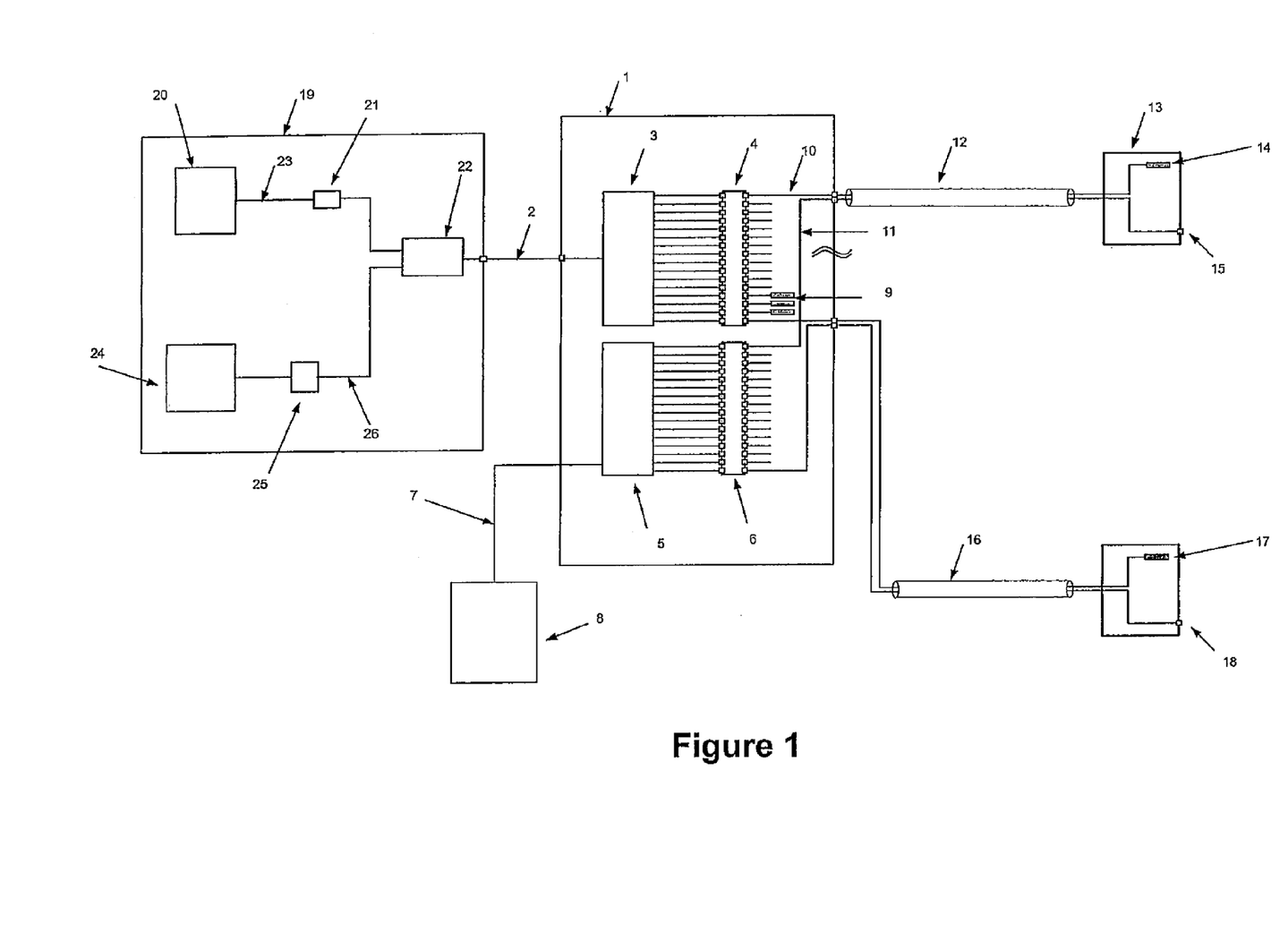
FIG. 1 is a schematic illustration of a first network in which the monitoring methods according to the present invention can be used.

As shown in FIG. 1, location 1 can be an optionally secure room or enclosure, with an input of at least a single optical strand of fiber 2. This fiber 2 inputs into a multiplexer 3 such as a WDM or 1×n splitter. Each output of the splitter 3 might pass through a patch panel 4 which then feeds multiple output fibers 10. Unused connections on the patch panel 4, or by inference multiplexer 3, are terminated 9, such as with either a reflective end, a non-reflective end, or a selective reflective end as dictated by the exact embodiment of the invention.

Concurrently, but not required by this invention, a network source such as an OLT 8 is connected through optical fiber 7 to a multiplexer 5, might feed through a patch panel 6, which feeds multiple output fibers including 11 similarly.

Fibers 10 and 11, and analogous other pairs fed by patch panels 4 and 6, are connected into a cable or conveyance 12, or multiple analogous cables or conveyances, leading to a remote location 13 which can be a room, closet, user box, or other appropriate termination. Within user box 13 the monitor fiber which is the optical extension of 10 is terminated at 14 in a specific manner appropriate to the embodiment. The extension of fiber 11 is available for user use such as data or content.

In an optionally secure area such as a room or an enclosure 19 optical source 20 is launched into optical fiber 23, optionally passed through optional optical device 21 into one side of an optical coupler 22 (for this purpose referred to as the input side). Optical receiver 24 is connected through optional optical device 25 through fiber 26 to the optical coupler 22 on the same side as the above described as input side. The common port of the coupler (for this purpose referred to as the output) exits via fiber 2.

Figure 2:
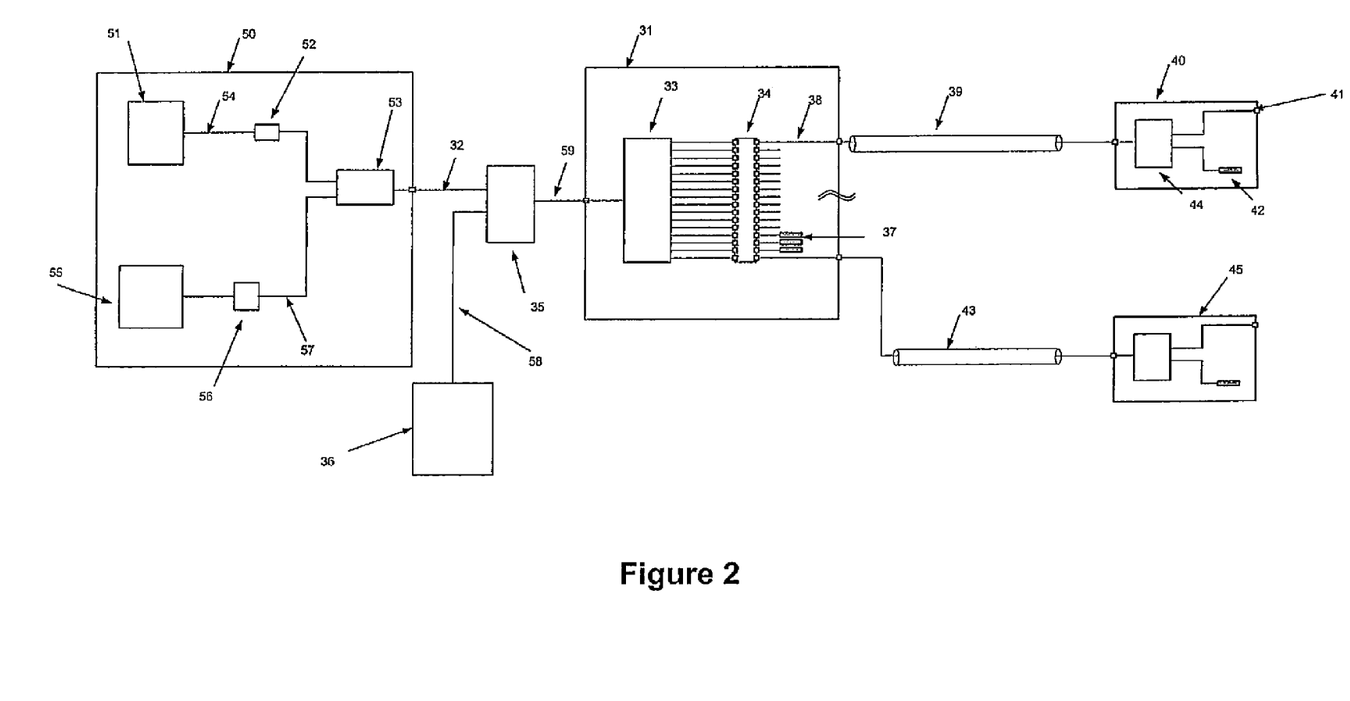
FIG. 2 is a schematic illustration of a second network in which the monitoring methods according to the present invention can be used.

As shown in FIG. 2, location 31 can optionally be a secure room or enclosure, with an input of at least a single optical strand of fiber 32. Optical fiber 59 inputs into a multiplexer 33 such as a WDM or 1×n splitter. Each output of the splitter 33 might pass through a patch panel 34 which then feeds multiple output fibers 38. Unused connections on the patch panel 34, or by inference multiplexer 33, are terminated 37, such as with either a reflective end, a non-reflective end, or a selective reflective end as dictated by the exact embodiment of the invention.

Fiber 38, and analogous other fibers fed by patch panels 34, are connected into a cable or conveyance 39, or multiple analogous cables or conveyances, leading to a remote location 40 which can be a room, closet, user box, or other appropriate termination. Within user box 40 the optical fiber which is the optical extension of 38 is input into optical device 44, which routes optical signals to termination 42 and preferably user data interface 41. Termination 42 is terminated in a specific manner appropriate to the embodiment.

In an optionally secure area such as a room or an enclosure 50 optical source 51 is launched into optical fiber 54, optionally passed through optional optical device 52 into one side of an optical device 53 (for this purpose referred to the input side). Optical receiver 55 is connected through optional optical device 56 through fiber 57 to the device 53 on the same side as the above described as input side. The common port of the coupler (for this purpose referred to as the output) exits via fiber 32. Fiber 32 enters optical device 35 on the arbitrarily labelled input side.

Concurrently, but not required by this invention, a network source such as an OLT 36 is connected through optical fiber 58 to optical device 35, also on the arbitrarily labelled input side. The output terminal on optical device 35 exits on fiber 59. Fiber 59 feeds into device 33 as described above.

In each of the embodiments shown in FIGS. 4 to 12 there is provided the method according to the present invention using the network as shown in FIG. 2 in which the network comprises a plurality of drop fibers 39A to 39X each having a first end at a network end 60 and a second end connected to respective ones of a plurality of terminals 40A to 40X at respective end users.

The data source 36 is provided at the network end 60 for supplying a data signal on an input fiber 58. The data on fiber 58 is multiplexed with a monitor signal from the monitoring system 50 at the multiplexer 35.

The combined data and monitoring signal on the input fiber 59 is separated or split to each of the plurality of drop fibers 39 for supply to the respective terminals 40 by a splitter 31.

The monitor system 50 including the monitoring signal source 51 is provided at the network end 60 and has a monitor signal output 32 from the monitor signal source 51. The monitor signal output with the data signal is split for supply along fibers 39 to the respective terminals 40 as a monitor signal by the splitter 31.

At each of the terminals 40 a return system 42A to 42X acts for returning the monitor signal back along fibers 39A to 39X respectively to the network end 60 where the received monitor signals after transmission along said fibers are analyzed at the monitor system 50 for changes in the monitor signals indicative of intrusion movement of said fibers for detecting an intrusion event on one or more of the drop fibers, as explained above.

The method further includes determining which one or more of the drop fibers has the movement concerned by modifying the monitor signal at the monitor signal source 51 and/or at the multiplexer/splitter 31 and/or at said returning device 42 so that the monitor signal of one drop fiber 39 has a difference from the monitor signal of the other drop fibers 39. This difference is detected at the monitor system 50 by a detector 62 to determine that one or more of the drop fibers which has the movement.

Figure 4:
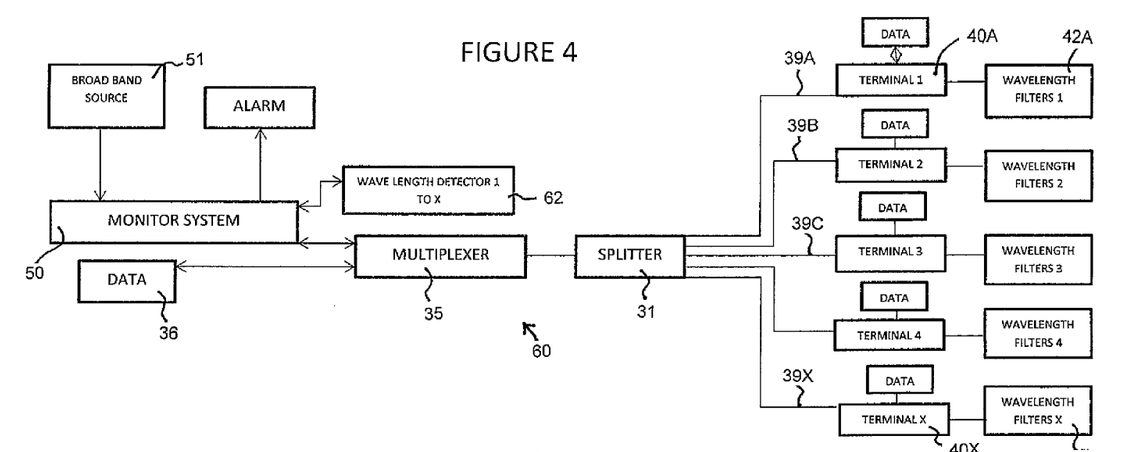
FIG. 4 is a schematic illustration of the network of FIG. 2 using a first embodiment of the method according to the present invention in which the signals are modified at the user terminals using wavelength filters so that each returned monitoring signal from the respective terminals is different from the others.
Figure 5:
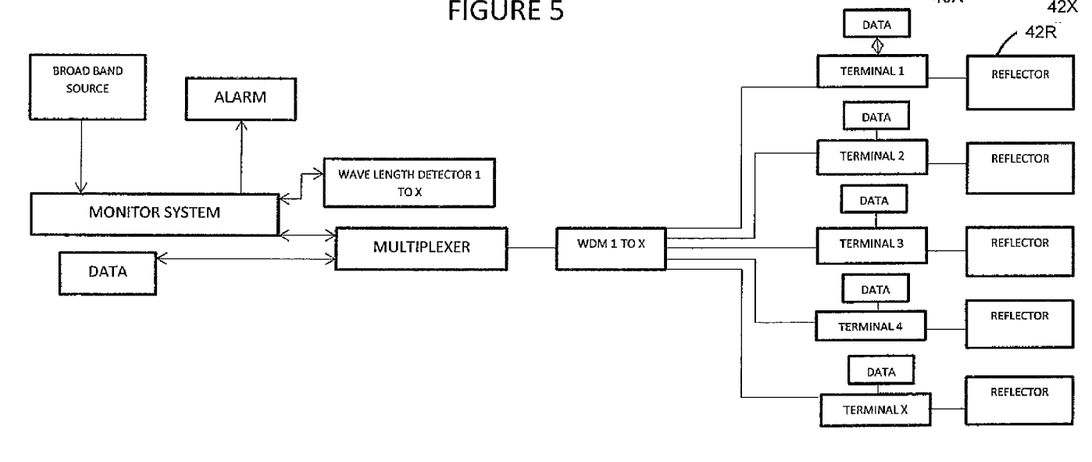
FIG. 5 is a schematic illustration of the network of FIG. 2 using a second embodiment of the method according to the present invention in which the signals are modified at the splitter using a wave length multiplexer (WDM) so that each transmitted monitoring signal to the respective terminals is different from the others and the signals are reflected unchanged from the user terminals.

In FIGS. 4 and 5, the monitor system uses Broadband as the source which utilizes a broad wavelength optical source 51 such as an LED, a splitter 3 of either DWDM, CWDM, or 1×N broadband. Wavelength discrimination, and therefore drop discrimination, is created by either wavelength selective distribution at either the splitter 31 by use of WDM or the termination 42 by use of wavelength selective reflections. Detection 62 requires wavelength discrimination, which cable 12 or drop 13 is being compromised is discerned by which wavelength is being affected.

In FIG. 4 the modification of the signal occurs at the return point 42 by using a wavelength filter such as a Bragg grating to generate a specific wavelength sent along the fiber 39 which is different from each of the other fibers.

In FIG. 5, the modification of the signal occurs at the splitter 31A by using a WDM to generate a specific set of different wavelengths sent along the fibers 39 each of which is different from each of the other fibers. At the return point 42R a simple reflection is provided.

Figure 6:
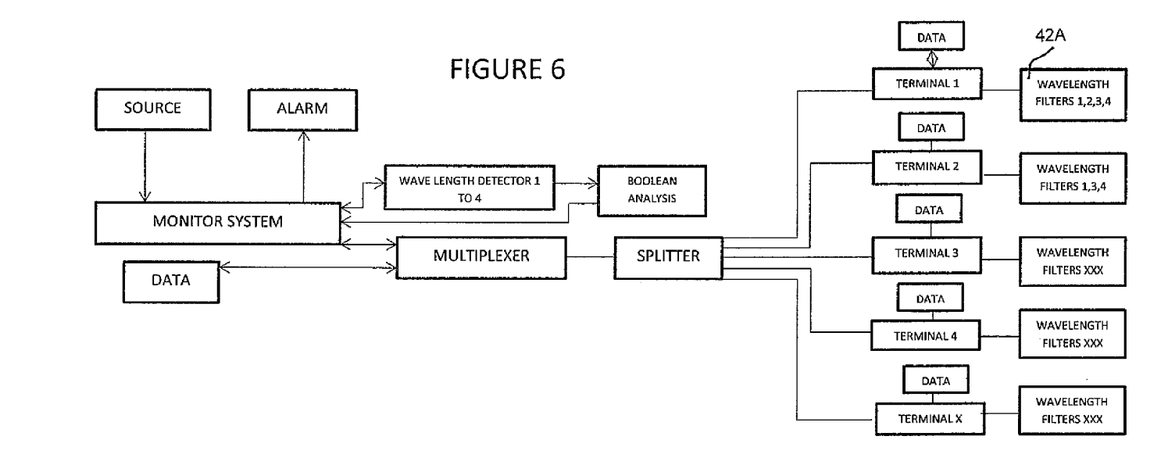
FIG. 6 is a schematic illustration of the network of FIG. 2 using a third embodiment of the method according to the present invention in which the signals are modified at the user terminals using a plurality of wavelength filters at each terminal so that each returned monitoring signal from the respective terminals contains a different set of the wavelengths allowing Boolean analysis of the wavelengths detected to identify the terminals concerned.
Figure 7:
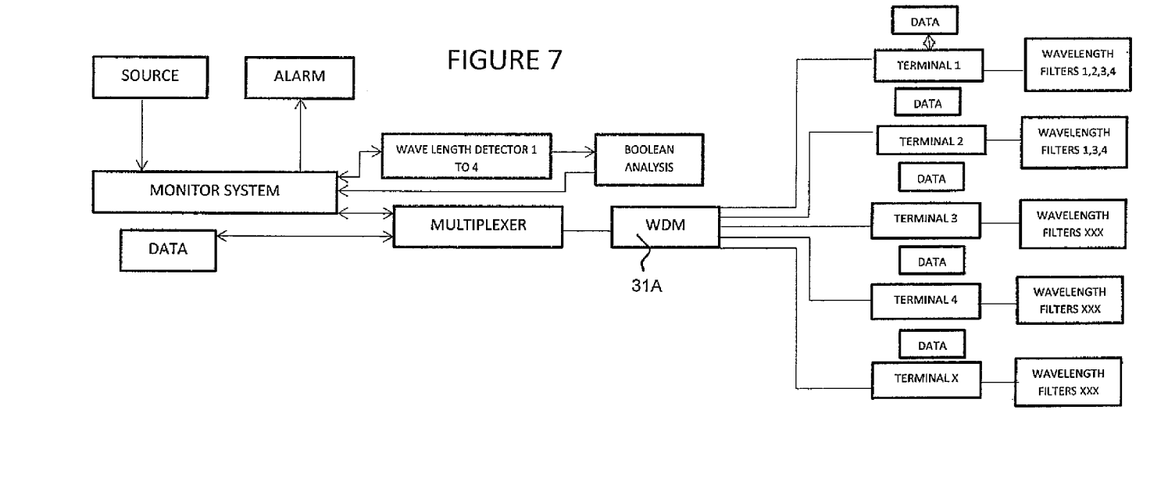
FIG. 7 is a schematic illustration of the network of FIG. 2 using a fourth embodiment of the method according to the present invention similar to that of FIG. 6 in which the signals are modified both at the splitter and at the user terminals using a plurality of wavelength filters at each terminal so that each returned monitoring signal from the respective terminals contains a different set of the wavelengths allowing Boolean analysis of the wavelengths detected to identify the terminals concerned.
Figure 8:
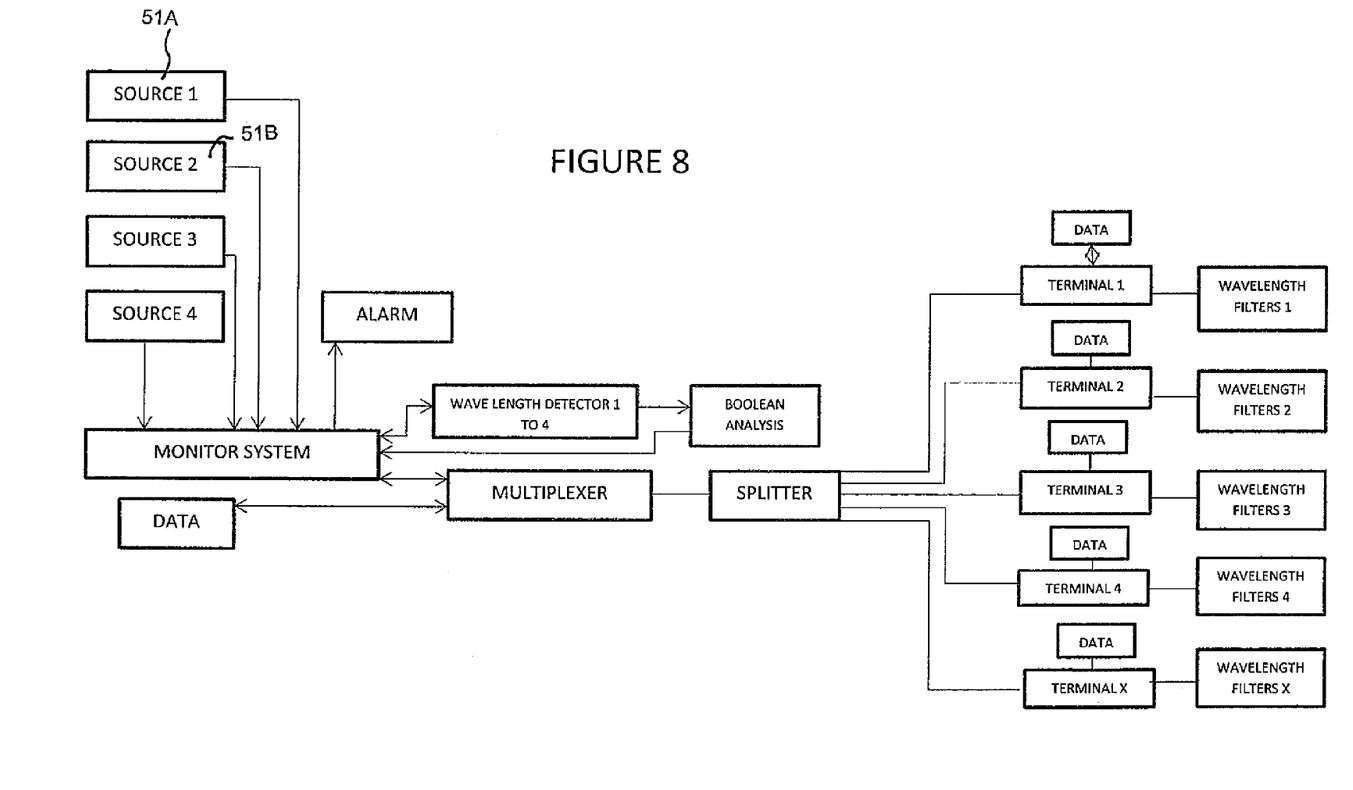
FIG. 8 is a schematic illustration of the network of FIG. 2 using a fifth embodiment of the method according to the present invention in which the signals are modified both at the source and at the user terminals using a plurality of wavelength filters at each terminal so that each returned monitoring signal from the respective terminals contains a different set of the wavelengths allowing Boolean analysis of the wavelengths detected to identify the terminals concerned.

In FIGS. 6, 7 and 8 are shown arrangements which utilize a multiple wavelength optical source 20 such as a multiple lasers 51A, 51B (FIG. 8) or a 1×N broadband splitter 31A (FIG. 7). Terminations 42A to 42X are each wavelength selective as shown in FIG. 6 and in the terminations shown in FIG. 3D or 3E. Referencing FIG. 3D, a WDM of N wavelengths with N=number of laser wavelengths, each leg terminated with either reflective or non-reflective treatment, creating a binary word corresponding to each drop. Similarly the arrangement in FIG. 3E creates the binary wavelength encoding by use of multiple Bragg Gratings or similar wavelength filter device that each reflect one wavelength and passes all others within the usable spectra. The total number of drops alarmed is fewer than $2^N$ as a logical all Zeros can mean no intrusion, and logical all is can indicate the common trunk 2 is being intruded upon so that these binary words cannot be used at the terminations.

Figure 9:
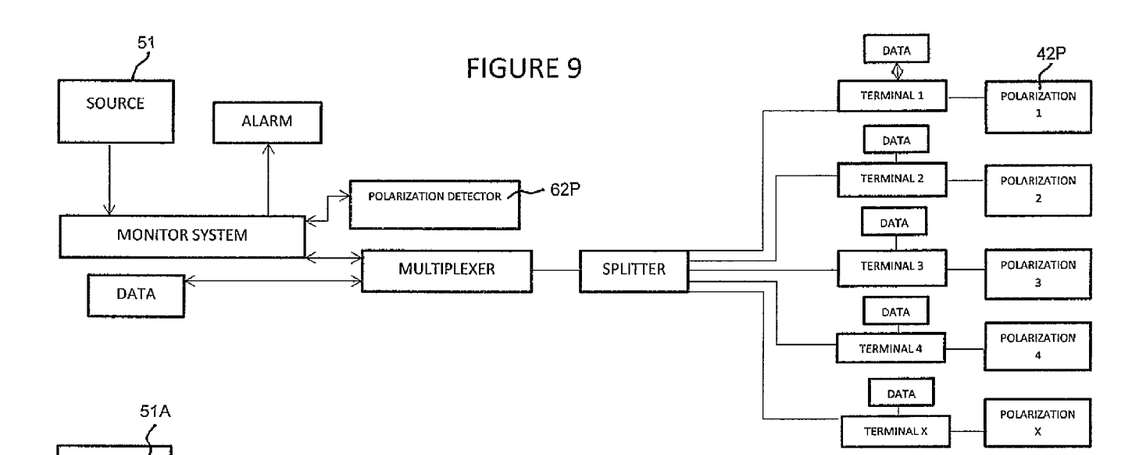
FIG. 9 is a schematic illustration of the network of FIG. 2 using a sixth embodiment of the method according to the present invention in which the signals are modified at the user terminals using polarizer at each terminal so that each returned monitoring signal from the respective terminals contains a different set of polarizations relative to a reference polarization to identify the terminals concerned.

In FIG. 9 is shown an arrangement using a polarizer 42P at the termination and a polarization detector 62P at the monitor system. Thus in this arrangement each polarizer 42P of the respective terminals is arranged to polarize the broadband monitor signal from the splitter 31 into return signals where the angle relative to a common reference value is polarized to a different angle of polarization. These signals are received a the monitor system, and when the presence of an intrusion event is detected the signal is analyzed using the detector 62P to determine the angle of polarization of the signal causing the intrusion event which indicates that one of the drops 39 where the intrusion even occurs. It is necessary to generate the angle of polarization relative to a reference angle because the intrusion events cause changes in polarization so that the angle will be lost in this change. However both the reference angle and the angle set by the respective polarizer 42P will both change so that the angle of one relative to the other will be detectable as this does not change.

Figure 10:
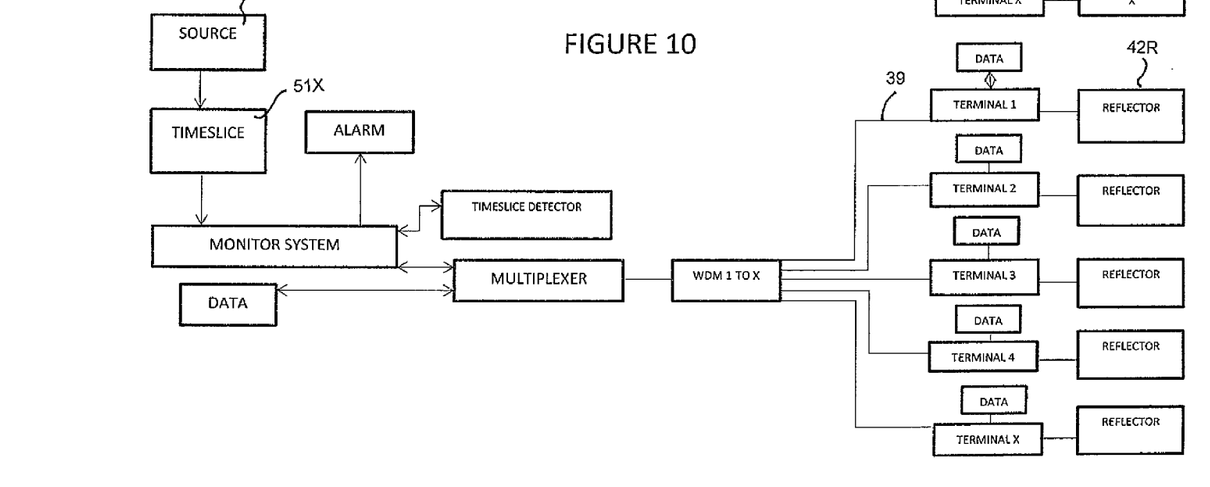
FIG. 10 is a schematic illustration of the network of FIG. 2 using a seventh embodiment of the method according to the present invention in which the signals are modified at the splitter using a WDM and also are divided into time slices so that each returned monitoring signal from the respective terminals contains a different wavelength and is transmitted in a time slice so that the terminal concerned can be detected by analyzing the time slices.

In FIG. 10 is shown an arrangement which uses a Time slice method in which a varying wavelength optical source 20 such as a tunable laser source 51A, a splitter 3 of either DWDM, CWDM, or 1×N broadband, and wavelength selective terminations 14. Wavelength discrimination, and therefore drop discrimination, is created by synchronizing a transmitter 51X at the source and a receiver 51Z at the monitor system. Detection 51Z requires no wavelength discrimination other than synchronization so that the complex more expensive sensing system required for wavelength discrimination can be avoided. Thus the detection of which cable drop fiber 39 is providing the intrusion event is discerned by which wavelength is being affected as indicated by the time slice concerned. A termination at 9 indicates an intrusion in the distribution trunk prior to the splitter. The terminations at 42R can use a simple reflection because the individual wavelengths provide by the source 51A are time sliced. An alternative which can be used is wavelength discrimination at the reflection with standard (non-WDM) splitter, as described hereinbefore.

Figure 11:
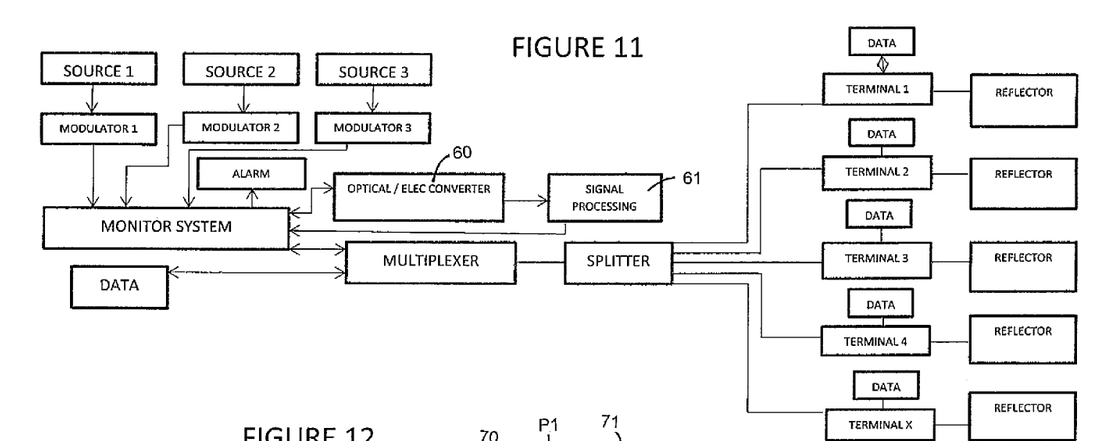
FIG. 11 is a schematic illustration of the network of FIG. 2 using an eighth embodiment of the method according to the present invention in which the signals are differentiated by wavelength at the source and are also modulated at different frequencies so that the signal analysis can be carried out in the electrical domain by converting the returned optical signals to an electrical signal.

In FIG. 11 an arrangement is provided where a plurality of separate wavelengths are provided each for a respective one of the terminals and each of these wavelengths is modulated electrically or optically by a different frequency. Modulation can be by amplitude, frequency, PCM or other appropriate modulation method. This allows the monitor system 24 to use a single broadband detector for the intrusion event and transmits the received broadband signal to an optical/electrical converter 60 allowing the wavelength discrimination to be carried out in a signal processing system 61 in the electrical domain. This reduces the cost of signal processing. Each optical wavelength is modulated with a unique modulation signature. When coupled with wavelength discriminating signal return, a wavelength discriminating optical detection system is not required. The combined signal from broad wavelength detection by a non-wavelength discriminating detector is analyzed for variations in the individually modulated signals. In this manner, unique modulation signatures for each wavelength maps optical changes to electrical signals, simplifying and cost reducing the detection system.

Figure 12:
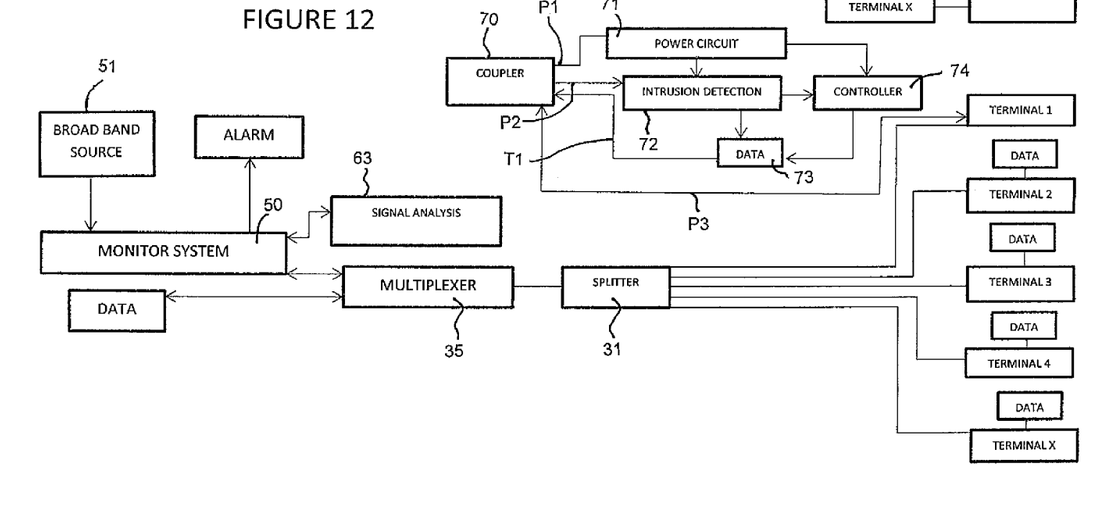
FIG. 12 is a schematic illustration of the network of FIG. 2 using a ninth embodiment of the method according to the present invention in which the signals are modified at the user terminals by analyzing received monitor signals after transmission along said fibers for changes in said monitor signals indicative of movement of the respective fiber for detecting an intrusion event on the respective fiber and conversion of data from the analysis into a signal which includes a signature signal for detection and the network end.

In FIG. 12 is shown a method which uses remote operation where near end transmits by the source 51 and splitter 3 one or more wavelengths or broadband light. This is fed through multiplexer 35 to combine into single monitor fiber.

Single monitor fiber inputs into the splitter 31, sending the signal off on each fiber 39 to the drops 40. Concurrently, optionally, the Data signal from the OLT is multiplexed into another set of fibers out to drops. The arrangement can use the two fibers of FIG. 1 or can be converted to one fiber of FIG. 2 by use of a WDM to combine data and monitor wavelengths.

At the remote drop, the monitor wavelength is split by a coupler into separate portions which do the following:

Portion P1, typically the greatest percentage of the transmitted light, is coupled to a transducer 71 such as a photocell which converts the optical power to electrical power. This electrical power is used to power the remaining circuitry in this module.

Portion P2, typically a smaller portion of the light, is fed into an optical intrusion detection system 72 which includes a detector such as a photo diode, then fed into a control system 74 which can include an A/D convertor. This return signal which includes data related to the intrusion detection analysis from the detector 72 is coupled with an identifier signature signal, and fed out the remaining port.

Portion P3, is used as an output to the terminal to transmit the data to the terminal. The return signal including the data obtained from eh signal analysis and the identifier signal back is transmitted by a data transmitter 73 to the network head end system including the monitor system which includes a signal analysis system 63 to look for the identifier signature signal from the terminal generating the intrusion event detected at the monitor system 50.

The data manipulation at the monitor system 50 at the head end provides the benefit of not only greater processing power in the presence of electrical power, it also simplifies software upgrades as algorithms and functions are improved.

Figure 13:
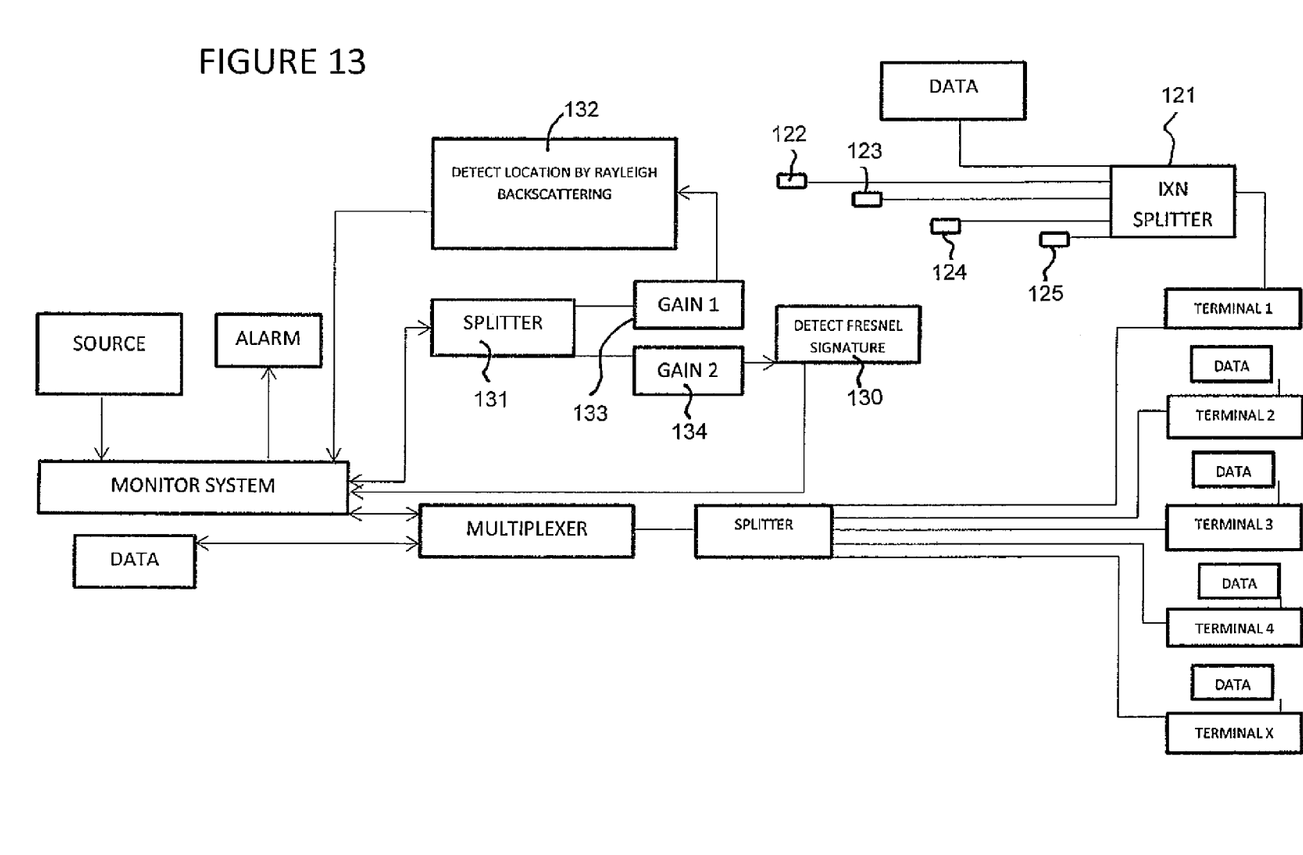
FIG. 13 is a schematic illustration of the network of FIG. 2 using a tenth embodiment of the method according to the present invention in which the signals are modified at the user terminals by providing a plurality of fiber paths each having a different length to a reflective return, with each terminal having a unique set of the lengths so that detection of the Fresnel reflections from the fiber paths at the network end can obtain the unique set which forms a signature.

In FIG. 13 is shown a method which uses an implementation is a subset of Optical Time Domain Reflectometry (OTDR) technology described in the above mentioned U.S. Pat. No. 7,142,737 to which reference can be made for further detail not described herein. In OTDR, two types of signals are reflected, Rayleigh scattering from fiber impurities, and the much larger Fresnel reflections from interfaces of dissimilar refractive indices such as a glass-air interface.

In this arrangement, a return signal from each terminal is modified to send a specific signature which can be detected at the network end by providing at each terminal a splitter 121 which separates the signal at the terminal into separate paths. One path provides the data signal. Each of the plurality of different paths has a different fiber length up to a reflective termination 122, 123, 124 and 125 for the example of four paths shown, as shown also in FIG. 3G. Thus the Fresnel reflection from each of the four ends will take place at a different time which can be detected at the network end by a detector 130. Each terminal is arranged to have a unique set of the lengths so that detection of the Fresnel reflections from the fiber paths at the network end at the detector 130 can obtain the unique set which forms a signature. In this way, adding a set of reflective ends to each drop 39 allows each leg 12 to be individually monitored.

At the network end there is provided a splitter 131 to utilize dual detector systems 130 for the Fresnel reflections and detector 132 for the Rayleigh backscattering. These detectors use a high gain 133 for Rayleigh scattering and low gain 134 for Fresnel. These gains may be implemented by separate receivers as shown or by time division multiplexing one receiver (not shown). The advantage is that Fresnel easily indicates which drop 39 is being intruded upon, while the Rayleigh will indicate where within that drop the intrusion is occurring. As Rayleigh is more difficult to detect, the Fresnel signal can be used to indicate that a drop 39 must be monitored for intrusion.

Turning now to FIGS. 3A to 3G, a number of different termination options are shown for the fibers 39 at the terminals 40.

Not shown is the simple reflective end which is used in a number of the above arrangements.

Figure 3A:
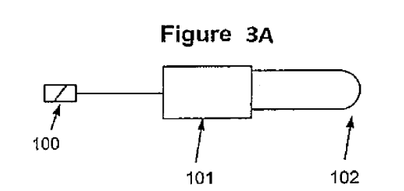
FIG. 3A to 3G show a series of different termination arrangements for the fibers at the respective end user terminals.

FIG. 3A provides a non-reflective connection 100 which delivers signal to a 1×2 optical coupler with output legs looped together. The signal entering the connection 100 is turned back by loop 102 and exits the connection. This acts similarly to a reflection in that it acts to return the received signal unmodified.

Figure 3B:
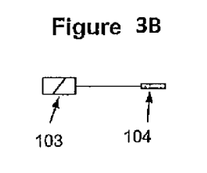

FIG. 3B illustrates a non-reflective connection 103 feeding a reflective end such as a gold tipped fiber. This acts as a simple reflection.

The simple reflection or the termination shown in FIG. 3A or 3B can be used in arrangements shown in FIG. 5, 10 or 11.

Figure 3C:
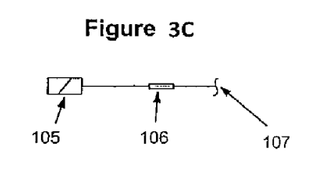

FIG. 3C illustrates a non-reflective connection 105 feeding a Bragg Grating or similar wavelength filter device 106 followed by a non-reflective termination 107 such as a dog-leg or index matching gel. Any incident light of wavelength matching that of the Bragg Grating 106 is reflected so that the return signal uses that wavelength only, passing all others to non-reflective termination 107. This termination can be used in the arrangement shown in FIG. 4.

Figure 3D:
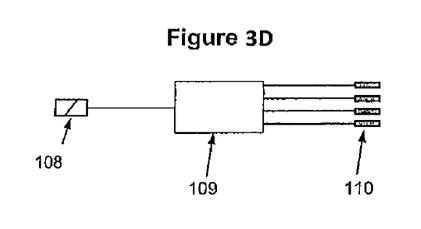

FIG. 3D illustrates a non-reflective connection 108, feeding a WDM coupler 109 whose legs each feed a reflective end 110 such as a gold tipped fiber. In this way, a binary word of wavelengths can be programmed as shown in the arrangement of FIG. 6. A variation is that 110 is a non-reflective connector such as angled, mated to a fiber terminated by reflective or non-reflective. This allows field programming of the binary word to be returned. That is the reflective signature or binary word can be encoded by using the WDM as optical device 109 at the termination, encoding a binary word by selecting reflective or non-reflective terminations for 110.

Figure 3E:
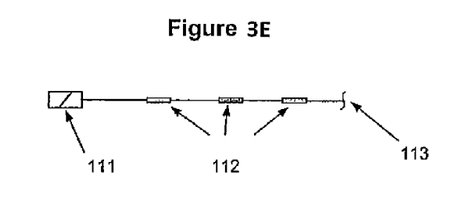

FIG. 3E illustrates an arrangement performs a similar function to that of FIG. 3D in that it includes a non-reflective connection 111 which feeds the optical signal through a string of one or more Bragg Gratings or similar devices 112, followed by a non-reflective tip 113. This allows for programming of a multiple wavelength reflection, different for each drop. This also can be used in the arrangement of FIG. 6.

Figure 3F:
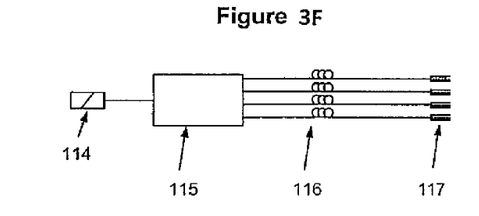

FIG. 3F illustrates a an arrangement including a 1×N coupler 115 which feeds a binary word developed by using dissimilar lead in fiber lengths with quarter wave retarders 116 and reflective or non-reflective ends 117. This allow a $2^N$ binary word to be used by means of linear or circular states of polarization of the reflected signal. Preferably the first reflection is of a known state for calibration purposes and operates as a reference. This arrangement is used in the construction shown in FIG. 9. Detection requires the ability to differentiate states of polarization at the detector 62P of FIG. 9, such as with multiple detectors or a polarimeter.

Figure 3G:
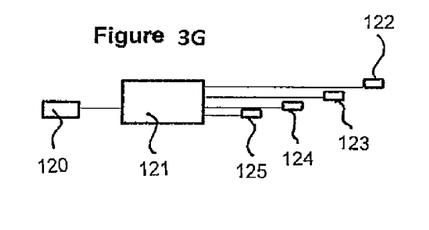

FIG. 3G shows the arrangement described above in relation to FIG. 13.

The invention claimed is:

1. A method for detecting intrusion into optical cables of a network, wherein the network comprises:

a plurality of drop cables each having a first end at a network end and a second end connected to respective ones of a plurality of terminals at respective end users;

each cable including at least one data transmission fiber and at least one monitoring fiber;

a multiplexing system for separating signals on an input fiber to each of the plurality of drop cables for supply to the respective terminals;

the method comprising:

providing a monitor system at the network end having a monitor signal output from a monitor signal source;

multiplexing the monitor signal output for supply along said monitoring fibers of the plurality of drop cables to the respective terminals as a monitor signal;

at each of the terminals, returning the monitor signal along said monitoring fibers to the network end;

at the network end analyzing received monitor signals after transmission along said monitoring fibers for changes in characteristics of said monitor signals which changes are indicative of movement of said monitoring fibers for detecting an intrusion event on one or more of the drop cables;

and determining which one or more of the drop cables has said movement thereof by modifying the monitor signal at one or more of said monitor signal source, said multiplexing and said returning;

so that the monitor signal of one drop cables has a difference from the monitor signal of another drop cable;

and detecting the difference to determine said one or more of the drop cables which has said movement.

2. The method according to claim 1 wherein the characteristic detected comprises, where said optical fiber comprises a multi-mode fiber, a modal power distribution therein and wherein the characteristic detected comprises, where said optical fiber comprises a single-mode fiber, a state of polarization therein.

3. The method according to claim 1 wherein the monitor signal is modified at one or more of the source and the multiplexing.

4. The method according to claim 1 wherein the monitor signal is modified at the terminal at returning.

5. The method according to claim 4 wherein the monitor signal is modified at the multiplexing by WDM to generate a plurality of different wavelengths.

6. The method according to claim 1 wherein the monitor signal is modified at one or more of the source and the multiplexing and is unchanged at the returning.

7. The method according to claim 1 wherein the monitor signal is modified by selecting a plurality of separate wavelengths.

8. The method according to claim 1 wherein the monitor signal on each fiber after multiplexing is the same for each drop cable and the monitor signal is modified at said returning.

9. The method according to claim 1 wherein the monitor signal is modified at return by one or more wavelength filters so that one or more wavelengths different are returned.

10. The method according to claim 9 wherein the wavelength filter is a Bragg grating.

11. The method according to claim 1 wherein the monitor signal is broadband.

12. The method according to claim 1 wherein the monitor signal is defined by a selected plurality of wavelengths.

13. The method according to claim 1 wherein the monitor signal is defined by a selected plurality of wavelengths and wherein the monitor signal is modified at return to return selected one or ones of the wavelengths and wherein Boolean analysis of all the wavelengths received at the network end is carried out to determine which of the wavelengths has said changes and therefore which of the drop cables has said movement.

14. The method according to claim 1 wherein each terminal contains a polarizer which generates a return signal of a predetermined difference in polarization relative to a reference polarization and wherein the predetermined difference of each terminal is different from each of the others.

15. The method according to claim 1 wherein the monitor signal is separated into separate signals if different wavelengths and each wavelength signal is modulated with a different frequency signature for each of the drop cables and wherein the received modulated signals in optical form are converted to an electrical signal for analysis of the different frequencies.

16. The method according to claim 1 wherein the monitor fibers of selected drop cables are disabled for monitoring by choosing a termination of the monitor fiber at the terminal thereof which does not return the signal.

17. A method for detecting intrusion into optical fibers of a network, wherein the network comprises:
a plurality of drop fibers each having a first end at a network end and a second end connected to respective ones of a plurality of terminals at respective end users;
a multiplexing system for separating signals on an input fiber to each of the plurality of drop fibers for supply to the respective terminals;
the method comprising:
providing a monitor system at the network end having a monitor signal output from a monitor signal source;
multiplexing the monitor signal output for supply along fibers to the respective terminals as a monitor signal;
at each of the user terminals providing at each of said end user terminals a monitor signal receiver system for analyzing received monitor signals after transmission along said fibers for changes in said monitor signals indicative of movement of the respective fiber for detecting an intrusion event on the respective fiber and conversion of data from the analysis into a signal;
transmitting the signal from each of the user end terminals back to the monitor system to provide a plurality of separate different signals each relating to a respective drop fiber;
and determining which one or more of the drop fibers has said movement thereof by detecting a difference between said plurality of separate different signals.

18. The method according to claim 17 wherein said monitor signal receiver system for detection and conversion of data from the analysis into a signal is powered by extracting energy from light transmitted to the respective user terminal.

19. A method for detecting intrusion into optical fibers of a network, wherein the network comprises:
a plurality of drop fibers each having a first end at a network end and a second end connected to respective ones of a plurality of terminals at respective end users;
a multiplexing system for separating signals on an input fiber to each of the plurality of drop fibers for supply to the respective terminals;
the method comprising:
providing a monitor system at the network end having a monitor signal output from a monitor signal source;
multiplexing the monitor signal output for supply along fibers to the respective terminals as a monitor signal;
at each of the user terminals splitting the monitor signal into a plurality of separate paths;
wherein each of the plurality of separate paths has a different fiber length up to a reflective end so that a Fresnel reflection from each of the ends will take place at a different time which can be detected at the network end by a detector;
wherein each terminal is arranged to have a unique set of the lengths so that detection of the Fresnel reflections from the fiber paths at the network end at the detector can obtain the unique set which forms a signature;
at the network end analyzing received monitor signals after transmission along said drop fibers for changes in said monitor signals indicative of movement of said drop fibers for detecting an intrusion event on one or more of the drop fibers;
and determining which one or more of the drop fibers has said movement thereof by said signature.

20. The method according to claim 19 wherein at the network end there is provided a detector system for the Fresnel reflections and for the Rayleigh backscattering and wherein the detector system uses a high gain for Rayleigh scattering and low gain for Fresnel reflections.

21. A method for detecting intrusion into optical fibers of a network, wherein the network comprises:
a plurality of drop fibers each having a first end at a network end and a second end connected to respective ones of a plurality of terminals at respective end users;
a multiplexing system for separating signals on an input fiber to each of the plurality of drop fibers for supply to the respective terminals;
the method comprising:

providing a monitor system at the network end having a monitor signal output from a monitor signal source;

multiplexing the monitor signal output for supply along fibers to the respective terminals as a monitor signal;

at each of the terminals, returning the monitor signal along fibers to the network end;

at the network end analyzing received monitor signals after transmission along said fibers for changes in characteristics of said monitor signals which changes are indicative of movement of said fibers for detecting an intrusion event on one or more of the drop fibers;

and determining which one or more of the drop fibers has said movement thereof by modifying polarization of the monitor signal at one or more of said monitor signal source, said multiplexing and said returning;

so that the monitor signal of one drop fiber has a difference in polarization of the signal from the signal of another drop fiber;

and detecting the difference in polarization to determine said one or more of the drop fibers which has said movement.

22. A method for detecting intrusion into optical fibers of a network, wherein the network comprises:

a plurality of drop fibers each having a first end at a network end and a second end connected to respective ones of a plurality of terminals at respective end users;

a multiplexing system for separating signals on an input fiber to each of the plurality of drop fibers for supply to the respective terminals;

the method comprising:

providing a monitor system at the network end having a monitor signal output from a monitor signal source;

multiplexing the monitor signal output for supply along fibers to the respective terminals as a monitor signal;

at each of the terminals, returning the monitor signal along fibers to the network end;

at the network end analyzing received monitor signals after transmission along said fibers for changes in characteristics of said monitor signals which changes are indicative of movement of said fibers for detecting an intrusion event on one or more of the drop fibers;

and determining which one or more of the drop fibers has said movement thereof by modifying frequency of the monitor signal at one or more of said monitor signal source, said multiplexing and said returning;

so that the monitor signal of one drop fiber has a difference in frequency of the signal from the signal of another drop fiber;

and detecting the difference in frequency to determine said one or more of the drop fibers which has said movement.

23. A method for detecting intrusion into optical fibers of a network, wherein the network comprises:

a plurality of drop fibers each having a first end at a network end and a second end connected to respective ones of a plurality of terminals at respective end users;

a multiplexing system for separating signals on an input fiber to each of the plurality of drop fibers for supply to the respective terminals;

the method comprising:

providing a monitor system at the network end having a monitor signal output from a monitor signal source;

multiplexing the monitor signal output for supply along fibers to the respective terminals as a monitor signal;

at each of the terminals, returning the monitor signal along fibers to the network end;

at the network end analyzing received monitor signals after transmission along said fibers for changes in characteristics of one or more of said monitor signals which changes are indicative of movement of said fibers for detecting an intrusion event on one or more of the drop fibers;

and determining which one or more of the drop fibers has said movement thereof by transmitting said monitor signals in selected time slices and by detecting which time slice the signal having said changes in characteristics is located.

* * * * *